Jan. 13, 1959 R. R. BIEWALD 2,868,308
BUG SHIELD FOR AUTOMOBILES
Filed Dec. 12, 1955

Robert R. Biewald
INVENTOR.

United States Patent Office 2,868,308
Patented Jan. 13, 1959

2,868,308
BUG SHIELD FOR AUTOMOBILES

Robert R. Biewald, Lincoln, Nebr., assignor of one-third to Hiram A. Sturges, Omaha, Nebr.

Application December 12, 1955, Serial No. 552,558

1 Claim. (Cl. 180—68)

This invention relates to a bug shield for automobiles and more particularly it is an object of this invention to provide a bug shield which has a closed upper portion rather than a screened upper portion, as heretofore commonly used, whereby bugs are blocked from striking the hood and windshield.

Heretofore upper portions of bug shields have been formed of screening. This has probably been the case because screening has been necessary in front of air intake ports to the radiator, and it is likewise a part of my invention to have my bug shield also made of screening at those points that are disposed across the air intake ports to the radiator.

However, heretofore, screens have retained the body flesh or body shell of the insect as well as the wings, but the body liquids have splattered on through the screen striking the hood and windshield.

However, it is my concept to provide a bug shield having a closed upper portion so as to prevent the body liquids of grasshoppers, yellow butterflies and other insects from splattering through the screen all over the hood and the windshield.

It is well known that it is extremely difficult to remove the body liquids of bugs from the hood of a car. Usually the heat of the summer sun and the heat of the motor have baked the body liquids to a hard cake and the driver wishing to clean the unsightly mess from his car has a most miserable time.

It is known that a chemical reaction exists between the paint finish of an automobile and the body liquids of insects. This chemical reaction usually has a sufficient time to penetrate the paint to a visible depth before the bug body liquid is normally removed.

It is therefore a further objective to make it easier than heretofore to maintain the appearance of an automobile.

Still another objective is to protect the car from the penetration of the paint to visible degrees by eliminating the cause of this chemical action.

A further objective of my invention is to provide a bug shield, having a closed upper portion for the further advantage that it serves as a bug deflector to guide the wind upwardly across the hood and windshield far better than the wind has ever heretofore been deflected in the use of small deflectors of the prior art which have heretofore been in the form of hood ornaments and the like which latter I have found are inadequate because the speed of the car causes wind currents with relation to the car of 80 and 90 miles an hour, as are storm velocities in which small deflectors are inadequate.

Other and further objects and advantages of the present invention will be apparent from the following detailed description, drawings and claim, the scope of the invention not being limited to the drawings themselves as the drawings are only for the purpose of illustrating a way in which the principles of this invention can be applied.

Other embodiments of the invention utilizing the same or equivalent principles may be used and structural changes may be made as desired by those skilled in the art without departing from the present invention and the purview of the appended claim.

Figures 1, 2:
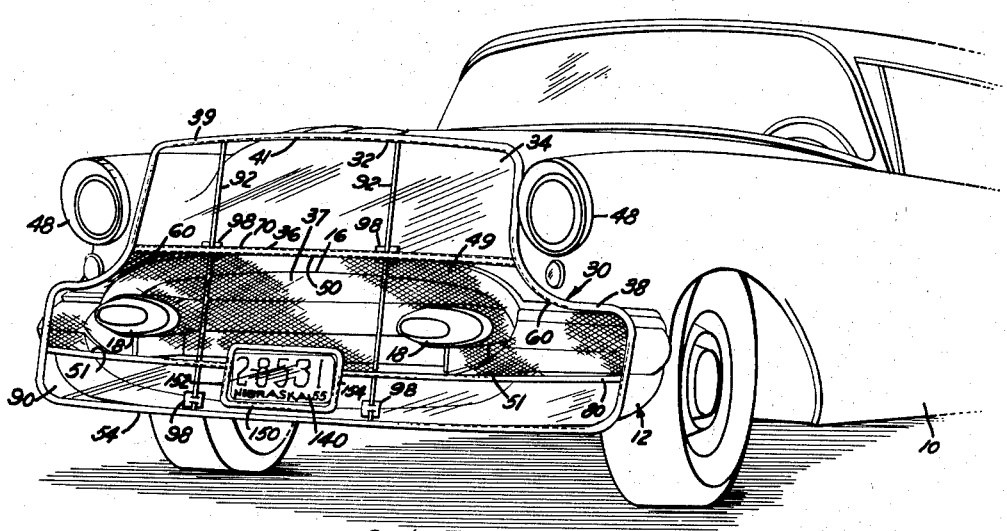
Fig. 1 is the perspective view of the forward end of an automobile showing the bug shield of this invention attached thereto.
Fig. 2 is a vertical section taken longitudinally of the automobile of Fig. 1, showing a forward portion of the automobile 10 in section, together with a sectional view of the bug shield.

The bug shield of this invention is adapted to be attached to an automobile of any type. For example, the automobile 10 of Fig. 1.

As best seen in Fig. 2, the automobile 10 has an upper hood portion 14 above the front end of the automobile, has an air intake port 16, forwardly projecting parking light assemblies 18, a bumper assembly having an upper portion 19 forming a bottom wall of the air intake port 16, the bumper assembly also having a forward wall having an upper portion 20 and a lower portion 22. The automobile has a forward license plate at 24.

In accordance with this invention a frame 30 is disposed transversely across the froward end of the automobile.

The frame 30 has an upper end portion 32 of an inverted U-shape having an open center in which I place a covering 34 which is of a closed material, or preferably at least a material which is substantially imperforate.

The upper covering 34 can be of a plastic material in which case it is preferable that it be transparent whereby the operator of the car can see the road through the covering 34.

The plastic covering 34 is preferably disposed extending across the area beneath the U-shaped portion 32 and extending downwardly terminating in a horizontal lower edge 36 disposed immediately above an air intake port area 37 of the automobile.

The covering 34 is held in place by any suitable means and a securing strip 39 is shown extending around the outside of the frame portion 32 and overlapping the forward and rearward sides of the covering 34.

Stitching 41 holds the securing strip 39 to the covering 34.

Beneath the horizontal lower edge 36 of the covering 34, the frame 30 has a lower upwardly opening frame portion 38 enclosing a large area encompassing substantially all of the area from the lower edge 36 down to the bottom of the bumper 12 of the automobile. The lower frame portion 38 is preferably of a shape generally rectangular in a lowermost portion thereof with the horizontal transverse width of the lowermost portion being greater than the horizontal width of the U-shaped upper frame portion 32 of the frame 30 so as to encompass the forward side area of the bumpers 12.

It is desirable to permit the headlights 48 of the automobile to extend outwardly on each side of the upper U-shaped frame portion 32. For this purpose the lower frame portion 38 has curved sections extending upwardly from its lower generally rectangular portion connected to the bottom ends of the sides of the U-shaped frame portion 32.

The upper part of the lower frame portion 38 is covered by a perforate member or screen 49 disposed in an upright position and having an upper edge 50 extending horizontally across the automobile and disposed closely above the air vent opening area 37. The screen 49 has a lower horizontal edge 51 preferably disposed immediately beneath the air vent opening area 16 and spaced above the lower side 54 of the lower frame member 38.

The screen 49 can be suitably secured in any desired manner to the edges of the frame portion 38 and the sides of the screen are of a shape complemental to the shape of sides of the lower frame portion 38, as shown at 60.

As best seen in Fig. 2 the screen 49 extends upwardly and downwardly and its upper end overlaps the lower edge 36 of the imperforate member 34.

A suitable strip of material 58 is disposed on the forward side of the screen 49 and along its upper edge and a further strip of suitable material 62 extends along the rearward side of the lowermost edge of the imperforate covering member 34.

The upper edge of the screen 49 and the lower edge of the upper covering 34 overlap and suitable stitching 70 extends through the strips 58 and 62 as well as through the screen 49 and upper imperforate covering 34 for holding them all together.

The screen 49 extends downwardly to a horizontal edge 51 spaced upwardly from the lower edge 54 of the lower frame member 38 and the screen 49 is joined to a lower imperforate member 90 by a forward strip member 80 and a rearward strip member which latter cannot be seen in the drawing, these strip members are disposed on a forward and rearward side of horizontally extending overlapping portions of the lower edge 51 of the screen 49 and the upper edge of the lower imperforate member 90.

The screen 49 and lower imperforate member 90 are secured to the lower frame member 38 by a continuation of the securing strip 39 and stitching 41.

The frame 30 is preferably braced by two vertical braces 92 which are attached by C-shaped brackets 96 to the bottom of the lower portion 38 and to the top of the upper frame portion 32.

Pads 98 are fixed to the braces 92 and prevent abrasion against the bumper portion 20 and the grille at 100.

Attaching assemblies are used having springs 110 provided with forward hooks 112 attached to the braces 92 and rearward hooks 114 attached to the rearward edges of the grille portion 120 which latter has an opening 121 in its rearward end.

The attaching assemblies are preferably such as to cooperate with the forward end of the automobile to hold the shield in a rearwardly inclining position so as to deflect air upwardly and rearwardly over the top of the car as illustrated by arrows 122 in Figure 2. This carries insects 130 safely away from the windshield and hood.

Other air passes through the screen 49 as indicated by arrows 138.

The license plate 24 can be seen through a transparent perforate viewing member 140 of my invention.

The viewing member 140 is disposed in front of the plate 24 and is mounted in a rectangular aperture cut into the screen 49 and lower perforate member 90.

The viewing member 140 is attached to the screen 49 and perforate member 90 by a forward rectangular securing strip 150 and a rearward like rectangular securing strip 152 by means of stitching 154.

It will be seen from Figure 2 that the inclination of the imperforate portion of the deflector is less than 30° and preferably about 15° as this directs air upwardly and fits an automobile to best advantage.

As thus described, the assembly shown is believed to fulfill the objectives above set forth.

From the foregoing description, it is thought to be obvious that a bug shield for automobiles constructed in accordance with my invention is particularly well adapted for use, by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

I claim:

In combination with an automobile having a windshield, a forward end disposed forwardly of said windshield, and an air intake opening in a lower portion of said forward end, an insect shield comprising a frame adapted to be placed transversely of the forward end of said automobile, said frame having an upper section and a lower section, said upper section of said frame extending substantially to the top of the forward end of said automobile, the upper edge of said shield being sufficiently close to the level of the top of the hood of said automobile so as not to substantially interfere with the driver's vision to the point of eye discomfort or loss of safety, substantially imperforate first covering means attached to and supported by the upper section of said frame, said substantially imperforate first covering means extending a substantial distance downwardly across a wide area of the forward end of said automobile for shielding that area from being splattered by the body liquids of insects, said lower section of said frame being disposed beneath said upper section and around said air intake opening, a perforate second covering means attached to and supported by said lower section of said frame in a position for covering said intake opening to admit air thereinto while prevening much of the body matter of the insects from entering said air intake opening, and means for attaching said frame to said automobile in a rearwardly inclined position whereby the said first covering means is maintained in a position for deflecting air upwardly as the automobile moves forward to create an air stream for carrying insects upwardly and across the top of the forward end and windshield of said automobile, said substantially imperforate first covering means extending over an area of substantial width whereby bugs are substantially prevented from striking the sides of the windshield.

References Cited in the file of this patent
UNITED STATES PATENTS

| | | |
|---|---|---|
| 2,501,065 | Longeway | Mar. 21, 1950 |
| 2,638,376 | Berry | May 12, 1953 |
| 2,726,727 | Abramson | Dec. 13, 1955 |
| 2,778,439 | Pfingsten | Jan. 22, 1957 |